Patented Jan. 5, 1932

1,839,702

UNITED STATES PATENT OFFICE

WILHELM PUNGS AND KARL EISENMANN, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

RECOVERY OF VOLATILE ORGANIC SOLVENTS

No Drawing. Application filed April 19, 1928, Serial No. 271,402, and in Germany May 21, 1927.

This invention relates to improvements in the recovery of volatile organic solvents from gaseous mixtures containing the same.

Volatile organic solvents are usually recovered by passing the gases, which contain the vapors of such solvents, over active charcoal or through sulfuric acid of suitable concentration, or by washing the gases with suitable organic liquids of high boiling point. For the most part, these processes are well adapted only for certain solvents, and are unsuitable, or imperfectly suitable, for others.

We have now found that volatile organic solvents of very divergent kinds may be recovered, with a satisfactory yield, by employing as the medium for washing the gases containing the vapors of the solvents, the products with a boiling point above 200° C. obtained as a by-product by the catalytic hydrogenation of the oxids of carbon to methanol or other compounds containing oxygen. The said by-products consist mainly of mixtures of alcohols of high molecular weight with preponderating amounts of ketones, aldehydes, esters and other unidentified compounds containing oxygen.

Compared with the washing oils hitherto used, the said products offer a series of advantages. In the first place may be mentioned their well-marked and extensive solvent capacity for volatile organic substances of a great variety of kinds. They may also have the advantage of not absorbing water so that the gases to be freed from the volatile solvents may also be washed therewith without any preliminary drying. Owing to their low viscosity and low solidification point (below 60° below zero C.), the new washing oils may be used for operating at temperatures considerably below 0° C. Their low volatility enables the absorbed solvents to be recovered, without appreciable loss, by distillation preferably in vacuo.

The following example will further illustrate the nature of the said invention which however is not limited thereto.

Example

A current of air saturated with benzene at 20° C. is treated with the fraction, boiling at above 200° C., of the by-products obtainable by the catalytic hydrogenation of oxids of carbon, the treatment being carried out, on the counter-flow principle, in a suitable absorption tower. At a working temperature of 20° C. the washing oil absorbs up to 59 per cent of its own weight of benzene.

What we claim is:

1. A process for the recovery of volatile solvents from gaseous mixtures containing the same which comprises washing the said gases with a product boiling above 200° C. obtainable as a by-product by the catalytic hydrogenation of the oxids of carbon and consisting of a mixture of alcohols of high molecular weight with preponderating amounts of ketones, aldehydes, esters and other unidentified organic compounds containing oxygen.

2. A process for the recovery of benzene from gaseous mixtures containing the same which comprises washing the said gases at about 20° C. with a product boiling above 200° C. obtainable as a by-product by the catalytic hydrogenation of the oxids of carbon and consisting of a mixture of alcohols of high molecular weight with preponderating amounts of ketones, aldehydes, esters and other unidentified organic compounds containing oxygen.

In testimony whereof we have hereunto set our hands.

WILHELM PUNGS.
KARL EISENMANN.